(12) United States Patent
Keromytis et al.

(10) Patent No.: US 7,490,268 B2
(45) Date of Patent: Feb. 10, 2009

(54) METHODS AND SYSTEMS FOR REPAIRING APPLICATIONS

(75) Inventors: Angelos D. Keromytis, New York, NY (US); Michael Locasto, New York, NY (US); Stylianos Sidiroglou, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 439 days.

(21) Appl. No.: 11/142,743

(22) Filed: Jun. 1, 2005

(65) Prior Publication Data

US 2006/0195745 A1 Aug. 31, 2006

Related U.S. Application Data

(60) Provisional application No. 60/576,398, filed on Jun. 1, 2004.

(51) Int. Cl.
G06F 11/00 (2006.01)

(52) U.S. Cl. .......................................... 714/38; 717/168
(58) Field of Classification Search .................... 714/38
See application file for complete search history.

(56) References Cited

U.S. PATENT DOCUMENTS

| | | | | |
|---|---|---|---|---|
| 5,960,170 | A * | 9/1999 | Chen et al. | 714/38 |
| 6,067,410 | A * | 5/2000 | Nachenberg | 703/28 |
| 6,378,087 | B1 * | 4/2002 | Flanagan et al. | 714/38 |
| 6,553,507 | B1 * | 4/2003 | Cohen | 714/4 |
| 6,907,396 | B1 * | 6/2005 | Muttik et al. | 703/22 |
| 7,181,652 | B2 * | 2/2007 | Shortz | 714/38 |
| 7,409,717 | B1 * | 8/2008 | Szor | 726/24 |
| 2002/0018528 | A1 | 2/2002 | Harada et al. | |
| 2002/0129277 | A1 * | 9/2002 | Caccavale | 713/201 |

(Continued)

OTHER PUBLICATIONS

Sidiroglou, S.; Keromytis, A.D.; A network worm vaccine architecture. Enabling Technologies: Infrastructure for Collaborative Enterprises, 2003. Wet Ice 2003. Proceedings. Twelfth IEEE International Workshops on Jun. 9-11, 2003 pp. 220-225.*

(Continued)

*Primary Examiner*—Scott T Baderman
*Assistant Examiner*—Paul F. Contino
(74) *Attorney, Agent, or Firm*—Byrne Poh LLP

(57) ABSTRACT

In accordance with the present invention, computer implemented methods and systems are provided that allow an application to automatically recover from software failures and attacks. Using one or more sensors, failures may be detected in the application. In response to detecting the failure, the portion of the application's code that caused the failure is isolated. Using the input vectors that caused the failure, information regarding the failure (e.g., the type of failure), a core dump file (e.g., stack trace), etc., an emulator-based vaccine that repairs the failure is constructed. In response to verifying that the vaccine repaired the failure, the application is automatically updated with the emulator-based vaccine without user intervention. Application community features that efficiently use the resources available in software monoculture is also provided. An application community may be defined that includes a plurality of devices and the application's code may be divided into smaller portions of code, which are assigned to each of the plurality of devices for monitoring. Each device also notifies the other devices of the failure.

39 Claims, 7 Drawing Sheets

U.S. PATENT DOCUMENTS

| | | | |
|---|---|---|---|
| 2002/0184528 A1* | 12/2002 | Shevenell et al. | 713/201 |
| 2004/0153823 A1 | 8/2004 | Ansari | |
| 2005/0015579 A1* | 1/2005 | Grover et al. | 712/244 |
| 2005/0071838 A1* | 3/2005 | Hatasaki | 717/168 |
| 2005/0086333 A1 | 4/2005 | Chefalas et al. | |
| 2005/0086630 A1 | 4/2005 | Chefalas et al. | |
| 2005/0114429 A1* | 5/2005 | Caccavale | 709/200 |
| 2005/0149749 A1* | 7/2005 | Van Brabant | 713/200 |

OTHER PUBLICATIONS

Costa et al. "Can We Contain Internet Worms ?" *Microsoft Research*, 2004, pp. 1-6.

Bowring et al. "Monitoring Deployed Software Using Software Tomography"*Paste '02*, 2002.

International Search Report and Written Opinion issued for corresponding International Application No. PCT/US2006/12839.

Amarasinghe, S.P. "On the Run—Building Dynamic Program Modifiers for Optimization, Introspection and Security," In Conference on Programming Language Design and Implementation (PLDI), 2002.

Avizienis, A. "The n-version approach to fault-tolerant software," IEEE Transactions on Software Engineering, 11(12):1491-1501, 1985.

Baratloo, A. et al., "Transparent Run-Time Defense Against Stack Smashing Attacks," In Proceedings of the USENIX Annual Technical Conference, Jun. 2000.

Barrantes, E.G. et al., Randomized Instruction Set Emulation to Disrupt Binary Code Injection Attacks, In Proceedings of the 10th ACM CCS, pp. 281-289, Oct. 2003.

Bhatkar, B. et al., "Address Obfuscation: an Efficient Approach to Combat a Broad Range of Memory Error Exploits," In Proceedings of the 12th USENIX Security Symposium, pp. 105-120, Aug. 2003.

Brilliant, S. et al., "Analysis of Faults in an N-Version Software Experiment," IEEE Transactions on Software Engineering, 16(2), Feb. 1990.

Bruening, D. et al., "An Infrastructure for Adpative Dynamic Optimization," In Proceedings of the International Symposium on Code Generation and Optimization, pp. 265-275, 2003.

Candea, G. et al., "Crash-Only Software," In Proceedings of the 9th Workshop on Hot Topics in Operating Systems, May 2003.

CERT Advisory CA-2003-21: W32/Blaster Worm. http://www.cert.org/advisories/CA-2003-20.html, Aug. 2003.

Chen, H. et al., "MOPS: an Infrastructure for Examining Security Properties of Software," In the Proceedings of the ACM Computer and Communications Security (CCS) Conference, pp. 235-244, Nov. 2002.

Chew, M. et al., "Mitigating Buffer Overflows by Operating System Randomization," Technical Report CMU-CS-02-197, Carnegie Mellon University, Dec. 2002.

Cowan, C. et al., "StackGuard: Automatic Adaptive Detection and Prevention of Buffer-Overflow Attacks," In Proceedings of the 7th USENIX Security Symposium, Jan. 1998.

Crosby, S.A. et al., "Denail of Service via Algorithmic Compleity Attacks," In Proceedings of the 12th USENIX Security Symposium, pp. 29-44, Aug. 2003.

Demsky, B. et al., "Automatic Detection and Repair of Errors in Data Structures," In Proceedings of the 18th Annual ACM SIGPLAN Conference on Object Oriented Programming, Systems, Languages, and Applications, Oct. 2003.

Dunlap, G.W. et al., "ReVirt: Enabling Intrusion Analysis Through Virtual-Machine Logging and Replay," In Proceedings of the Symposium on Operating Systems Design and Implementation (OSDI), Feb. 2002.

Garfunkel, T. et al., "A Virtual Machine Introspection Based Architecture for Intrusion Detection," In 10th ISOC Symposium on Network and Distributed Systems Security (SNDSS) Feb. 2003.

Geer, D.E. "Monopoly Considered Harmful," IEEE Security & Privacy, 1(6):14 & 17, Nov./Dec. 2003.

Goth, G. "Addressing the Monoculture," IEEE Security & Privacy, 1(6):8-10, Nov./Dec. 2003.

Jim, T. et al., "Cyclone: A safe dialect of C," In Proceedings of the USENIX Annual Technical Conference, pp. 275-288, Jun. 2002.

Kc, S. et al., "Countering Code-Injection Attacks With Instruction-Set Randomization," In 10th ACM Conference on Computer and Communications Security (CCS), Oct. 2003.

King, S.T. et al., "Backtracking Intrusions," In 19th ACM Symposium on Operating Systems Principles (SOSP), Oct. 2003.

King, S.T. et al., "Operating System Support for Virtual Machines," In Proceedings of the USENIX Annual Technical Conference, Jun. 2003.

Kiriansky, V. et al., "Secure Execution Via Program Sheparding," In Proceedings of the 11th USENIX Security Symposium, Aug. 2002.

Locasto, M.E. et al., "Application Communities: Using Monoculture for Dependability," In Proceedings of the $1^{st}$ *Workshop on Hot Topics in System Dependability* ( *HotDep*), held in conjunction with the International Conference on Dependable Systems and Networks (DSN), pp. 288-292. Jun. 2005, Yokohama, Japan.

Locasto, M.E. et al., "Softwar Self-Healing Using Collaborative Application Communities," In Proceedings of the Internet Society (ISOC) Symposium on Network and Distributed Systems Security (SNDSS), pp. 95-106. Feb. 2006, San Diego, CA.

Mosberger, D. et al., "httperf: A tool for measuring web server performance," In First Workshop on Internet Server Performance, pp. 59-67, ACM, Jun. 1998.

Nethercote, N. et al., "Valgrind: A Program Supervision Framework," In Electronic Notes in Theoretical Computer Science, vol. 89, 2003.

Newsome, J. et al., "Dynamic Taint Analysis for Automatic Detection, Analysis, and Signature Generation of Exploits on Commodity Software," In The 12th Annual Network and Distributed System Security Symposium, Feb. 2005.

Oplinger, J. et al., "Enhancing Software Reliability with Speculative Threads," In Proceedings of the 10th Internatioal Conference on Architectural Support for Programming Language and Operating Systems (ASPLOS X), Oct. 2002.

Prevelakis, V. "A Secure Station for Network Monitoring and Control," In Proceedings of the 8th USENIX Security Symposium, Aug. 1999.

Provos, N. "Improving Host Security with System Call Policies," In Proceedings of the 12 USENIX Security Symposium, pp. 257-272, Aug. 2003.

Reynolds, J.C. et al., "On-Line Intrusion Detection and Attack Prevention Using Diversity, Generate-Test, and Generalization," In Proceedings of the 36th Annual Hawaii International Conference on System Sciences (HICSS), Jan. 2003.

Rinard, M. et al., "A Dynamic Technique for Eliminating Buffer Overflow Vulnerabilities (and Other Memory Errors)," In Proceedings 20th Annual Computer Security Applications Conference (ACSAC), Dec. 2004.

Rinard, M. et al., "Enhancing Server Available and Security Through Failur-Oblivious Computing," In Proceedings 6th Symposium on Operating Systems Design and Implementation (OSDI), Dec. 2004.

Rudys, A. et al., "Termination in Language-based Systems," ACM Transactions on Information and System Security, 5(2), May 2002.

Rudys, A. et al., "Transactional Rollback for Language-Based Systems," In ISOC Symposium on Network and Distributed Systems Security (SNDSS), Feb. 2001.

Shacham, H. et. al., "On the Efffeciveness of Address-Space Randomization," In Proceedings of the 11th ACM Conference on Computer and Communications Security (CCS), pp. 298-307, Oct. 2004.

Sidiroglou, S. et al., "A Network Worm Vaccine Architecture," In Proceedings of the IEEE Workshop on Enterprise Technologies: Infrastructure for Collaborative Enterprises (WETICE), Workshop on Enterprise Security, pp. 220-225, Jun. 2003.

Sidiroglou, S. et al., "Building A Reactive Immune System for Software Services," In Proceedings of the 11th USENIX Annual Technical Conference (to appear), Apr. 2005.

Smirnov, A. et al., "DIRA: Automatic Detection, Identification, and Repair of Control-Hijacking Attacks," In the 12th Annual Network and Distributed System Security Symposium, Feb. 2005.

Stamp, M. "Risks of Monoculture," Communications of the ACM, 47(3):120, Mar. 2004.

Suh, G.E. et al., "Secure program execution via dynamic information flow tracking," SIGOPS Oper. Syst. Rev., 38(5):85-96, 2004.

The Spread of the Sapphire/Slammer Worm. http://www.silicondefense.com/research/worms/s;ammer.php, Feb. 2003.

Toth, T. et al., "Accurate Buffer Overflow Detection via abstract Payload Execution," In Proceedings of the 5th Symposium on Recent Advances in Intrusion Detection (Raid), Oct. 2002.

Wang, N. et al., "Y-Branches: When You Come to a Fork in the Road, Take It," In Proceedings of the 12th International Conference on Parallel Architecture and Compliation Techniques, Sep. 2003.

Whittaker, J.A. "No Clear Answers on Monoculture Issues," IEEE Security & Privacy, 1(6):18-19, Nov./Dec. 2003.

Yin, J. et al., "Separating Agreement from Execution for Byzantine Fault Tolerant Service," In Proceedings of ACM SOSP, Oct. 2003.

* cited by examiner

500

```
void foo() {
    int a = 1;
    emulate_init();
    emulate_begin(p_args);
    a++;
    emulate_end();
    emulate_term();
    printf("a = %d\n", a);
}
```

| $f_i$ | $x_i$ | $r_i$ | $v_i$ | $T$ | $C(f_i, x_i)$ | $r_i * v_i$ |
|---|---|---|---|---|---|---|
| a() | 100 | 1 | $\alpha_1$ | 600 | 16 | $\alpha_1$ |
| b() | 200 | 2 | $\alpha_2$ | 600 | 33 | $2\alpha_2$ |
| c() | 300 | 3 | $\alpha_3$ | 600 | 50 | $3\alpha_3$ |

METHODS AND SYSTEMS FOR REPAIRING APPLICATIONS

CROSS REFERENCE TO RELATED APPLICATION

This application claims the benefit under 35 U.S.C. § 119(e) of U.S. Provisional Patent Application No. 60/576,398, filed Jun. 1, 2004, which is hereby incorporated by reference herein in its entirety.

FIELD OF THE INVENTION

The present invention generally relates to approaches for reacting to a wide variety of software failures. More particularly, the present invention relates to methods and systems for automatic recovery from software faults and attacks.

BACKGROUND OF THE INVENTION

Applications may terminate due to any number of threats, program errors, software faults, attacks, or any other suitable software failure. Computer viruses, worms, trojans, hackers, key recovery attacks, malicious executables, probes, etc. are a constant menace to users of computers connected to public computer networks (such as the Internet) and/or private networks (such as corporate computer networks). In response to these threats, many computers are protected by antivirus software and firewalls. However, these preventative measures are not always adequate. For example, many services must maintain a high availability when faced by remote attacks, high-volume events (such as fast-spreading worms like Slammer and Blaster), or simple application-level denial of service (DoS) attacks.

Aside from these threats, applications generally contain errors during operation, which typically result from programmer error. Regardless of whether an application is attacked by one of the above-mentioned threats or contains errors during operation, these software faults and failures result in illegal memory access errors, division by zero errors, buffer overflows attacks, etc. These errors cause an application to terminate its execution or "crash."

Solutions have been proposed, for example, that implement proactive approaches, which seek to make the code as dependable as possible through the use of safe languages, libraries and compilers, code analysis tools, and development methodologies. Debugging aids that attempt to make post-fault analysis and recovery as easy as possible for the programmer have also been proposed. Byzantine fault tolerance schemes have also been proposed that use voting among a number of service instances to select the correct answer. However, these fault-tolerance schemes operate under the assumption that only a minority of the replicas will exhibit faulty behavior. In fact, many of these approaches to solving this problem are generally proactive, but these strategies do not result in error-free code. These solutions typically exhibit problems, such as reduced system performance, monotonous and bothersome user interaction, and self-induced denial of service (i.e., when an overflow is detected, the only alternative is to terminate the application). In addition, with regard to server applications, server applications often cannot be simply restarted because they are typically long running (accumulate a fair amount of state) and usually contain a number of threads that service many remote users. Restarting the server denies service to other users. As a result, software remains notoriously buggy and crash-prone. Moreover, these solutions are inappropriate for high performance, high availability environments, such as a frequently-visited e-commerce web server.

In addition, these applications may be installed on a number of platforms, such as a personal digital assistant (PDA), a cellular telephone, or an automobile personal computer. For example, an open platform operating system has been used on automobile personal computers to allow users to install third-party applications that have been designed for the platform. These applications are also vulnerable to software failures. While antivirus programs are currently being developed for these platforms to protect the applications from such failures, they often require user interaction (e.g., downloading a patch or another application, connecting the device to a personal computer, etc.) and reduce system performance by taking up the platform's already limited space, memory, and transmission bandwidth.

Therefore, there is a need in the art for methods and systems for providing a more reactive and automated approach for handling a variety of software failures such that application can recover from such failures without requiring user intervention and reducing system performance.

Accordingly, it is desirable to provide methods and systems that overcome these and other deficiencies of the prior art.

SUMMARY OF THE INVENTION

In accordance with some embodiments of the present invention, a self-healing system and method that allows an application to automatically recover from software failures and attacks are provided. By selectively emulating all or a portion of the application's code or otherwise detecting that a fault has occurred, the system immediately surrounds the detected fault to validate the operands to machine instructions, as appropriate for the type of fault. The system emulates that portion of the application's code with a fix. This may be done by updating the application code, or through non-invasive means (e.g., through a wrapper or debugger-style process control). This increases service availability in the presence of general software bugs, software failures, and attacks (e.g., a computer virus, a worm, a trojan, a malicious executable, a probe, a denial of service attack, a resource depletion attack, a buffer overflow, a buffer underflow, an illegal memory access, a division by zero, a time-of-check-to-time-of-use (TOCTTOU) violation, and/or programming errors).

In some embodiments, a method and system for detecting and repairing an application from software failures is provided. Using one or more sensors (e.g., host-based sensors, passive sensors, honeypots, etc.), the application is monitored for a failure. In accordance with some embodiments of the present invention, the sensor may be a honeypot implemented on a separate server that simulates the application.

In response to detecting the failure, the portion of the application's code that caused the failure is isolated. Using the input vectors that caused the failure, information regarding the failure (e.g., the type of failure), a core dump file (e.g., stack trace), etc., an emulator-based vaccine that repairs the failure is constructed. In response to verifying that the vaccine repaired the failure, the application is updated with the emulator-based vaccine.

Alternatively, the sensors may analyze the application's code and predict which portions of the code are vulnerable to failure, or which portions of the code have a higher probability of exhibiting a particular failure.

In accordance with some embodiments of the present invention, a system and a method that creates an application community to efficiently use the resources available in software monoculture are provided. These combined resources may be used to provide protection for each member of the application community, while spreading the cost (e.g., computational, memory, disk, etc.) of detecting and analyzing failures across all the members of the community.

In some embodiments, an application community may be defined that includes a plurality of devices (e.g., workstations, servers, etc.). The application's code may be divided into smaller portions of code, which are assigned for monitoring to each of the plurality of devices. It should be noted that the portions of code may be assigned by static allocation, random allocation, weighted allocation, volunteer allocation, and bargaining-style allocation. It should also be noted that other suitable approaches for assigning code portions for monitoring may also be used in conjunction or in place of the above-mentioned approaches. Alternatively, instead of assigning portions of code, specific failures may be assigned to each of the plurality of devices.

In response to receiving the assigned portion of code, each device monitors the assigned portion of the code of the application for a failure in the local instance of the application, analyzes the assigned portion of the code in response to detecting the failure, and constructs an emulator-based vaccine that repairs the failure. In response to verifying that the vaccine repaired the failure, each device updates the application with the emulator-based vaccine and notifies the other devices of the failure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 5 shows an illustrative example of emulated code integrated into the code of an existing application in accordance with some embodiments of the present invention.

FIG. 7 shows an illustrative example of a table that may be calculated by a member of the application community for distributed bidding in accordance with some embodiments of the present invention.

DETAILED DESCRIPTION OF THE PREFERRED EMBODIMENTS

In the following description, numerous specific details are set froth regarding the methods and systems of the present invention and the environment in which such methods and systems may operate, etc., in order to provide a thorough understanding of the present invention. It will be apparent to one skilled in the art, however, that the present invention may be practiced without such specific details, and that certain features which are well known in the art are not described in detail in order to avoid complication of the subject matter of the present invention. In addition, it will be understood that the examples provided below are exemplary, and that it is contemplated that there are other methods and systems that are within the scope of the present invention.

Figure 1:
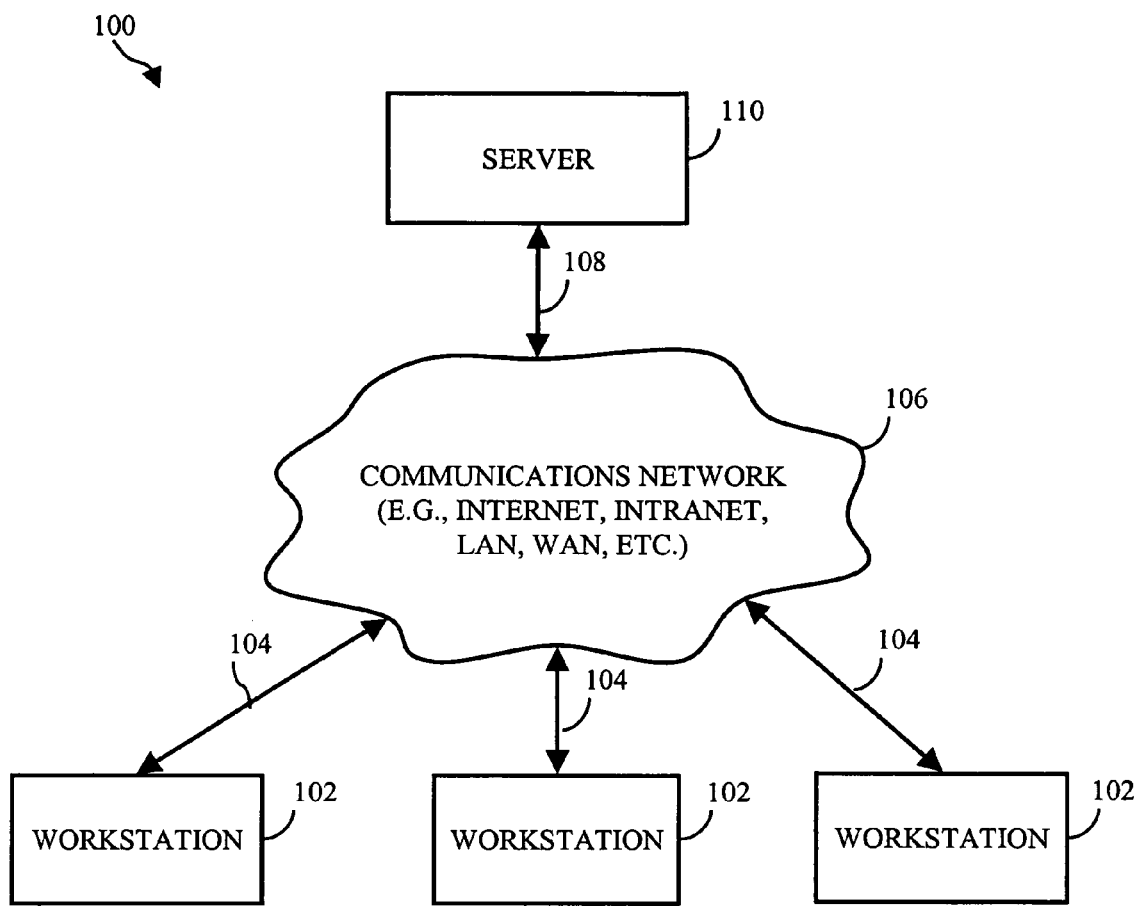
FIG. 1 is a schematic diagram of an illustrative system suitable for implementation of an application that monitors other applications and protects these applications against faults in accordance with some embodiments of the present invention.

FIG. 1 is a schematic diagram of an illustrative system 100 suitable for implementation of an application that monitors, repairs, and updates other applications in accordance with some embodiments of the present invention. Referring to FIG. 1, an exemplary system 100 for implementing the present invention is shown. As illustrated, system 100 may include one or more workstations 102. Workstations 102 may be local to each other or remote from each other, and are connected by one or more communications links 104 to a communications network 106 that is linked via a communications link 108 to a server 110.

In system 100, server 110 may be any suitable server for executing the application, such as a processor, a computer, a data processing device, or a combination of such devices. Communications network 106 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 104 and 108 may be any communications links suitable for communicating data between workstations 102 and server 110, such as network links, dial-up links, wireless links, hard-wired links, etc. Workstations 102 may be personal computers, laptop computers, mainframe computers, dumb terminals, data displays, Internet browsers, personal digital assistants (PDAs), two-way pagers, wireless terminals, portable telephones, etc., or any combination of the same. Workstations 102 and server 110 may be located at any suitable location. In one embodiment, workstations 102 and server 110 may be located within an organization. Alternatively, workstations 102 and server 110 may be distributed between multiple organizations.

Figure 2:
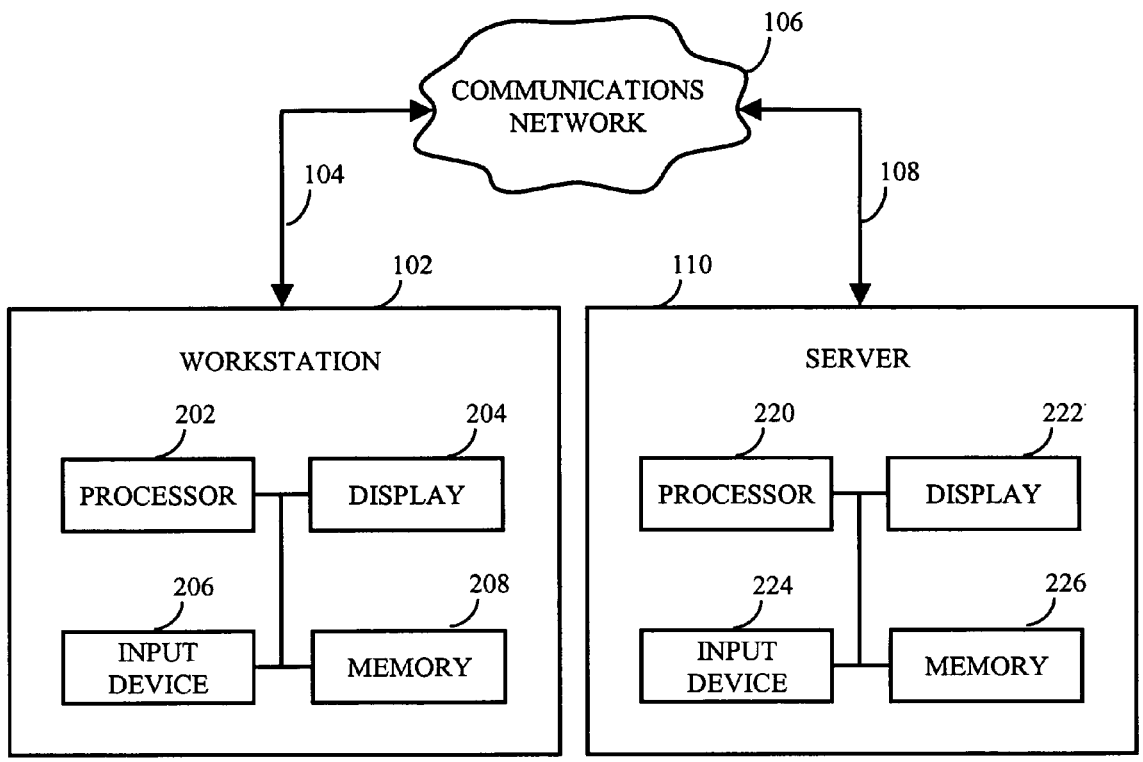
FIG. 2 is a detailed example of the server and one of the workstations of FIG. 1 that may be used in accordance with some embodiments of the present invention.

The server and one of the workstations, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 202. Memory 208 may also contain an application for detecting and repairing application from faults according to the invention. In some embodiments, the application may be resident in the memory of workstation 102 or server 110.

In one particular embodiment, the application may include client-side software, hardware, or both. For example, the application may encompass one or more Web-pages or Web-page portions (e.g., via any suitable encoding, such as Hyper-Text Markup Language (HTML), Dynamic HyperText Markup Language (DHTML), Extensible Markup Language (XML), JavaServer Pages (JSP), Active Server Pages (ASP), Cold Fusion, or any other suitable approaches).

Although the application is described herein as being implemented on a workstation, this is only illustrative. The application may be implemented on any suitable platform (e.g., a personal computer (PC), a mainframe computer, a dumb terminal, a data display, a two-way pager, a wireless terminal, a portable telephone, a portable computer, a palmtop computer, a H/PC, an automobile PC, a laptop computer, a personal digital assistant (PDA), a combined cellular phone and PDA, etc.) to provide such features.

Processor 202 may use the workstation program to present on display 204 the application and the data received through communication link 104 and commands and values transmitted by a user of workstation 102. It should also be noted that data received through communication link 104 or any other communications links may be received from any suitable source, such as web services. Input device 206 may be a computer keyboard, a cursor-controller, a dial, a switchbank, lever, or any other suitable input device as would be used by a designer of input systems or process control systems.

Server 110 may include processor 220, display 222, input device 224, and memory 226, which may be interconnected. In a preferred embodiment, memory 226 contains a storage device for storing data received through communication link 108 or through other links, and also receives commands and values transmitted by one or more users. The storage device further contains a server program for controlling processor 220.

Generally speaking, the present invention is directed to methods and systems for detecting faults in an application and, upon detection of a fault, inhibiting and/or preventing the fault from occurring in future executions of the application. It should be noted that the terms "applications" and "services" are used interchangeably herein. For example, as described below, an application or a service may be monitored using one or more software probes for specific types of faults. It should also be noted that the terms "fault," "attack," and "failure" are used interchangeably herein. For example, as described below, the system is used to react to a wide variety of software failures, faults, and attacks. These software failures and attacks include, for example, illegal memory accesses, division by zero, and buffer overflow (more generally, control-hijacking) attacks.

In accordance with some embodiments of the present invention, a self-healing system that allows an application to automatically recover from software failures and attacks is provided. By selectively emulating at least a portion or all of the application's code when the system detects that a fault has occurred, the system surrounds the detected fault to validate the operands to machine instructions, as appropriate for the type of fault. The system emulates that portion of the application's code with a fix and updates the application. This increases service availability in the presence of general software bugs, software failures, attacks.

Figure 3:
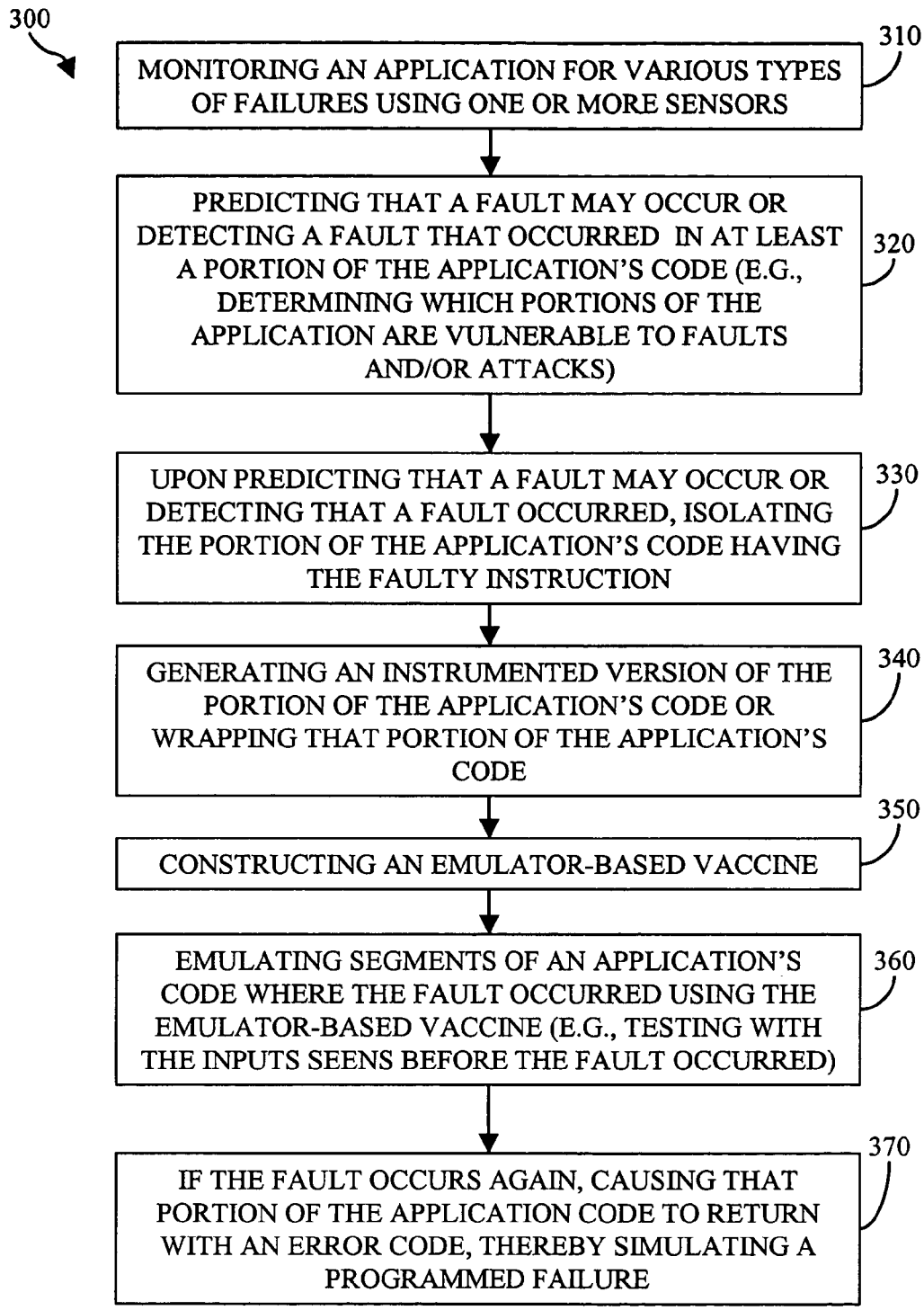
FIG. 3 shows a simplified flowchart illustrating repairing faults in an application and updating the application in accordance with some embodiments of the present invention.
Figure 4:
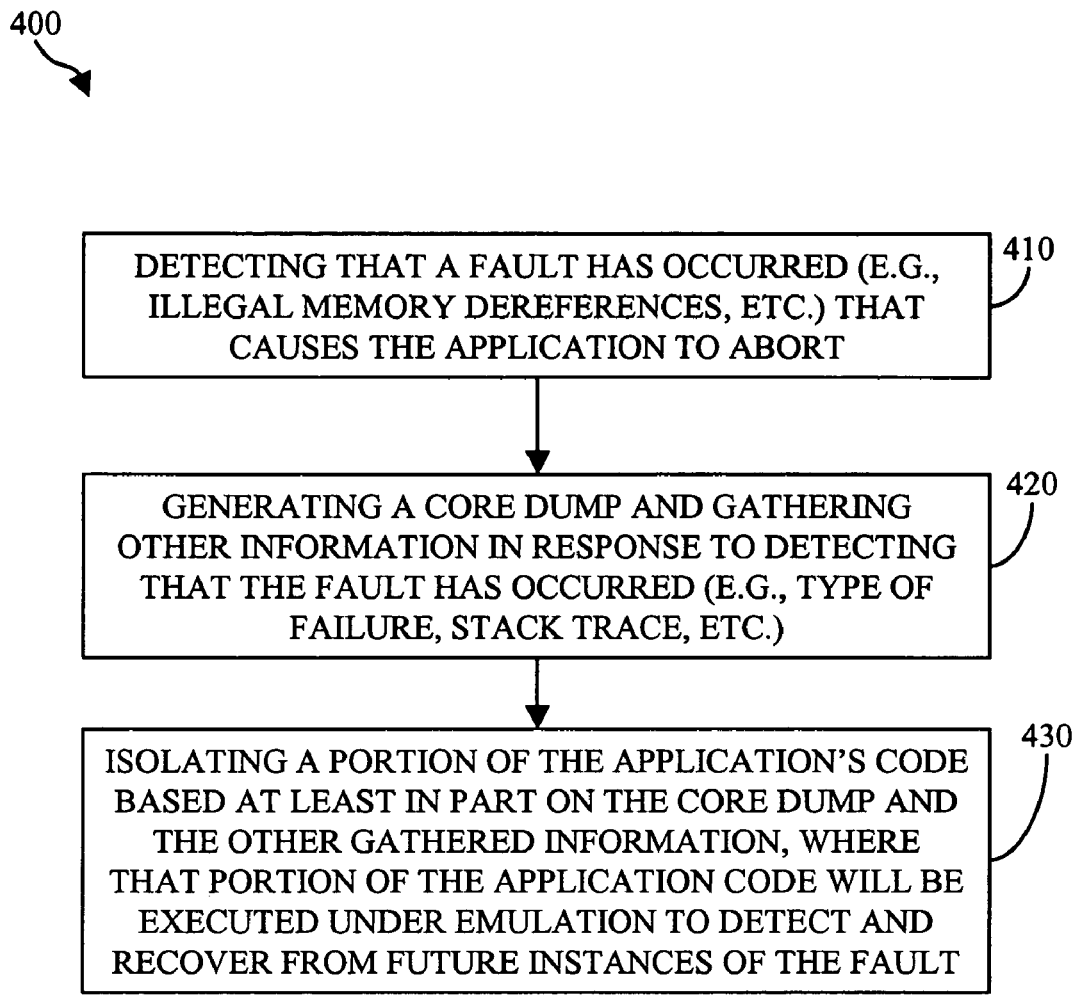
FIG. 4 shows a simplified flowchart illustrating detecting and repairing an application in response to a fault occurring in accordance with some embodiments of the present invention.

Turning to FIGS. 3 and 4, simplified flowcharts illustrating the various steps performed in detecting faults in an application and fixing the application in accordance with some embodiments of the present invention are provided. These are generalized flow charts. It will be understood that the steps shown in FIGS. 3 and 4 may be performed in any suitable order, some may be deleted, and others added.

Generally, process 300 begins by detecting various types of failures in one or more applications at step 310. In some embodiments, detecting for failures may include monitoring the one or more applications for failures. In some embodiments, the monitoring or detecting of failures may be performed using one or more sensors at step 310. As described previously, failures include programming errors, exceptions, software faults (e.g., illegal memory accesses, division by zero, buffer overflow attacks, time-of-check-to-time-of-use (TOCTTOU) violations, etc.), threats (e.g., computer viruses, worms, trojans, hackers, key recovery attacks, malicious executables, probes, etc.), and any other suitable fault that may cause abnormal application termination or adversely affect the one or more applications. For example, a set of sensors may monitor applications running on a web server for failures.

Any suitable sensors may be used to detect failures or monitor the one or more applications. In some embodiments, host-based sensors that monitor the behavior of deployed applications and servers may be used. In another suitable embodiment, passive sensors on the firewall may be used to eavesdrop or listen to traffic that is traveling to and from the servers (e.g., server 110 of FIG. 1). In some embodiments, honeypots that simulate the behavior of the target application and capture any communication may be also be used. A honeypot may be, for example, a separate server that acts as a decoy, luring in potential hackers, while only providing the potential hackers with limited access to the network, thereby allowing the honeypot to monitor the hackers and determine how the hackers are able to break into a system. Honeypots may be installed inside firewalls. Although it should be noted that honeypots are capable of being installed outside of firewalls. It should also be noted that any combination of sensors may be used simultaneously. These sensors may communicate with each other, with the server, or with one or more workstations.

At step 320, feedback from the sensors may be used to predict which parts of a given application's code may be vulnerable to a particular class of attack (e.g., remotely exploitable buffer overflows). In some embodiments, the sensors may also detect that a fault has occurred. Upon predicting that a fault may occur or detecting that a fault has occurred, the portion of the application's code having the faulty instruction or vulnerable function is isolated, thereby localizing predicted faults at step 330.

Alternatively, as shown and discussed in FIG. 4, the one or more sensor may monitor the application until it is caused to abnormally terminate. The system may detect that a fault has occurred, thereby causing the actual application to terminate. As shown in FIG. 4, at step 410, the system forces a misbehaving application to abort. In response to the application terminating, the system generates a core dump file or produces other failure-related information, at step 420. The core dump file may include, for example, the type of failure and the stack trace when that failure occurred. Based at least in part on the core dump file, the system isolates the portion of the application's code that contains the faulty instruction at step 430. Using the core dump file, the system may apply selective emulation to the isolated portion or slice of the application. For example, the system may start with the top-most function in the stack trace.

Referring back to FIG. 3, in some embodiments, the system may generate an instrumented version of the application (step 340). For example, an instrumented version of the application may be a copy of a portion of the application's code or all of the application's code. The system may observe instrumented portions of the application. These portions of the application may be selected based on vulnerability to a particular class of attack. The instrumented application may be executed on the server that is currently running the one or more applications, a separate server, a workstation, or any other suitable device.

It should be noted that isolating a portion of the application's code and using the emulator on the portion allows the system to reduce and/or minimize the performance impact on the immunized application. However, while this embodiment isolates a portion or a slice of the application's code, the entire application may also be emulated. The emulator may be implemented completely in software, or may take advantage of hardware features of the system processor or architecture, or other facilities offered by the operating system to otherwise reduce and/or minimize the performance impact of monitoring and emulation, and to improve accuracy and effectiveness in handling failures.

An attempt to exploit such a vulnerability exposes the attack or input vector and other related information (e.g., attacked buffer, vulnerable function, stack trace, etc.). The attack or input vector and other related information is then used to construct an emulator-based vaccine or a fix that implements array bounds checking at the machine-instruction level at step 350, or other fixes as appropriate for the detected type of failure. The vaccine is then tested in the instrumented application using an instruction-level emulator (e.g., libtasvm x86 emulator, STEM x86 emulator, etc.) to determine whether the fault was fixed and whether any other functionality (e.g., critical functionality) has been impacted by the fix.

By continuously testing various vaccines using the instruction-level emulator, the system may verify whether the specific fault has been repaired by running the instrumented application against the event sequence (e.g., input vectors) that caused the specific fault. For example, to verify the effectiveness of a fix, the application may be restarted in a test environment or a sandbox with the instrumentation enabled, and is supplied with the one or more input vectors that caused the failure. A sandbox generally creates an environment in which there are strict limitations on which system resources the instrumented application or a function of the application may request or access.

At step 360, the instruction-level emulator is selectively invoked for segments of the application's code, thereby allowing the system to mix emulated and non-emulated code within the same code execution. The emulator may be used to, for example, detect and/or monitor for a specific type of failure prior to executing the instruction, record memory modifications during the execution of the instruction (e.g., global variables, library-internal state, libc standard I/O structures, etc.) and the original values, revert the memory stack to its original state, and simulate an error return from a function of the application. That is, upon entering the vulnerable section of the application's code, the instruction-level emulator captures and stores the program state and processes all instructions, including function calls, inside the area designated for emulation. When the program counter references the first instruction outside the bounds of emulation, the virtual processor copies its internal state back to the device processor registers. While registers are updated, memory updates are also applied through the execution of the emulation. The program, unaware of the instructions executed by the virtual processor, continues normal execution on the actual processor.

In some embodiments, the instruction-level emulator may be linked with the application in advance. Alternatively, in response to a detected failure, the instruction-level emulator may be compiled in the code. In another suitable embodiment, the instruction-level emulator may be invoked in a manner similar to a modern debugger when a particular program instruction is executed. This may take advantage of breakpoint registers and/or other program debugging facilities that the system processor and architecture possess, or it may be a pure-software approach, as appropriate for the operating system and hardware of the device on which the invention is implemented.

The use of an emulator allows the system to detect and/or monitor a wide array of software failures, such as illegal memory dereferences, buffer overflows, and buffer underflows, and more generic faults, such as divisions by zero. The emulator checks the operands of the instructions it is about to emulate using, at least partially, the vector and related information provided by the one or more sensors that detected the fault. For example, in the case of a division by zero, the emulator checks the value of the operand to the div instruction. In another example, in the case of illegal memory dereferencing, the emulator verifies whether the source and destination address of any memory access (or the program counter for instruction fetches) points to a page that is mapped to the process address space using the mincore( ) system call, or the appropriate facilities provided by the operating system. In yet another example, in the case of buffer overflow detection, the memory surrounding the vulnerable buffer, as identified by the one or more sensors, is padded by one byte. The emulator then watches for memory writes to these memory locations. It should be noted that this requires source code availability so as to insert particular variables (e.g., canary variables that launch themselves periodically and perform some typical user transaction to enable transaction-latency evaluation around the clock). It should also be noted that the emulator prevents the overflow before it overwrites the remaining locations in the memory stack and recovers the execution. Other approaches for detecting these failures may be incorporated in the system in a modular way, without impacting the high-level operation and characteristics of the system.

For example, the instruction-level emulator may be implemented as a statically-linked C library that defines special tags (e.g., a combination of macros and function calls) that mark the beginning and the end of selective emulation. An example of the tags that are placed around a segment of the application's code for emulation by the instruction-level emulator is shown in FIG. 5. As shown in FIG. 5, the C macro emulate_init( ) moves the program state (general, segment, eflags, and FPU registers) into an emulator-accessible global data structure to capture state immediately before the emulator takes control. The data structure is used to initialize the virtual registers. emulate_begin( ) obtains the memory location of the first instruction following the call to itself. The instruction address is the same as the return address and can be found in the activation record of emulate_begin( ), four bytes above its base stack pointer. The fetch/decode/execute/retire cycle of instructions continues until either emulate_end( ) is reached or when the emulator detects that control is returning to the parent function. If the emulator does not encounter an error during its execution, the emulator's instruction pointer references the emulate_term( ) macro at completion. To enable the instrumented application to continue execution at this address, the return address of the emulate_begin( ) activation record is replaced with the current value of the instruction pointer. By executing emulate_term( ), the emulator's environment is copied to the program registers and execution continues under normal conditions.

It should be noted that although the embodiments of the invention describe that the emulator is linked with the vulnerable application and/or that the source code of the vulnerable application is available, the present invention may also use the processor's programmable breakpoint register to invoke the emulator without the running process even being able to detect that it is now running under an emulator.

In addition to monitoring for failures prior to executing instructions and revert memory changes made by a particular function when the failure occurs (e.g., by having the emulator store memory modifications made during its execution), the emulator also simulates an error return from the function. Using the present invention, the system may generate a map between a set of errors that may occur during an application's execution and a limited set of errors that are explicitly handled by the application's code (sometimes referred to herein as "error virtualization"). As described below, the error virtualization features of the present invention may be based on heuristics. However, any suitable approach for determining the return values for a function may be used. For example, aggressive source code analysis techniques to determine the return values that are appropriate for a function may be used. In another example, portions of code of specific functions may be marked as fail-safe and a specific value may be returned when an error return is forced (e.g., for code that checks user permissions). In yet another example, the error value returned for a function that has failed may be determined using information provided by a programmer, system administrator, or any other suitable user.

These error virtualization features allow an application to continue execution even though a boundary condition that was not originally predicted by a programmer allowed a fault to occur. In particular, error virtualization features allows for the application's code to be retrofitted with an exception catching mechanism, for faults that were unanticipated by the programmer. It should be noted that error virtualization is different from traditional exception handling as implemented by some programming languages, where the programmer must deliberately create exceptions in the program code and also add code to handle these exceptions. Under error virtualization, the present invention catches failures and exceptions that were unanticipated by, for example, the programmer, and the present invention uses existing application code to handle them. In some embodiments of the invention, error virtualization is implemented through the instruction-level emulator. Alternatively, error virtualization may be implemented through additional source code that is inserted in the application's source code directly. This insertion of such additional source code may be performed automatically, following the detection of a failure or following the prediction of a failure as described previously, or it may be done under the direction of a programmer, system operator, or other suitable user having access to the application's source code.

Using error virtualization, when an exception occurs during the emulation or if the system detects that a fault has occurred, the system may return the program state to its original settings and force an error return from the currently executing function. To determine the appropriate error value, the system analyzes the declared type of function. In some embodiments, the system may analyze the declared type of function using, for example, a TXL script. Generally, TXL is a hybrid function and rule-based language that may be used for performing source-to-source transformation and for rapidly prototyping new languages and language processors. Based on the declared type of function, the system determines the appropriate error value and places it in the stack frame of the returning function. The appropriate error value may be determined based at least in part on heuristics. For example, if the return type is an int, a value of −1 is returned. If the return type is an unsigned int, the system returns a 0. If the function returns a pointer, the system determines whether the returned pointer is further dereferenced by the parent function. If the returned pointed is further dereferenced, the system expands the scope of the emulation to include the parent function. In another example, the return error code may be determined using information embedded in the source code of the application, or through additional information provided to the system by the application programmer, system administrator or third party.

In some embodiments, the emulate_end( ) is located and the emulation terminates. Because the emulator saved the state of the application before starting and kept track of memory modification during the application's execution, the system is capable of reversing any memory changes made by the code function inside which the fault occurred by returning it to its original setting, thereby nullifying the effect of the instructions processed through emulation. That is, the emulated portion of the code is sliced off and the execution of the code along with its side effects in terms of changes to memory have been rolled back.

For example, the emulator may not be able to perform system calls directly without kernel-level permissions. Therefore, when the emulator decodes an interruption with an intermediate value of 0x80, the emulator releases control to the kernel. However, before the kernel executes the system call, the emulator backs up the real registers and replaces them with its own values. An INT 0x80 is issued by the emulator and the kernel processes the system call. Once control returns to the emulator, the emulator updates its registers and restores the original values in the application's registers.

If the instrumented application does not crash after the forced return, the system has successfully found a vaccine for the specific fault, which may be used on the actual application running on the server. At step 370, the system updates the application based at least in part on the emulation.

In accordance with some embodiments of the present invention, artificial diversity features may be provided to mitigate the security risks of software monoculture.

Software monoculture has been identified as a problem for networked computing environments. Monocultures act as amplifiers for attackers, allowing attackers to exploit the same vulnerability across numerous instances (e.g., thousands or millions of instances) of the same application. Such attacks have the potential to rapidly cause widespread disruption, as evidenced by several recent incidents.

While many other system attempt to introduce artificial diversity, benefits of the already-existing software monoculture may be used to mitigate the security risks of software monoculture. In some embodiments, application communities may be created to efficiently use the resources available in large monocultures to provide protection for each application community member. As used herein, application communities are collections of independent instances of the same application that cooperatively monitor their execution for flaws and attacks and notify the community when such events are detected. For example, in the system described above, the one or more workstations and the server running one or more applications across a wide area network (e.g., the Internet) may be members of an application community. Each workstation may collaborate by monitoring a different portion of an application's code, thereby distributing the memory allocated by each workstation for monitoring the application. In another suitable embodiment, each workstation may collaborate by monitoring the application for a different failure. In response to detecting that the monitored portion of code may be vulnerable to a failure or in response to detecting the occurrence of a failure in the monitored portion of the application's code, the workstation may inform the other workstations and the server of the failure.

Figure 6:
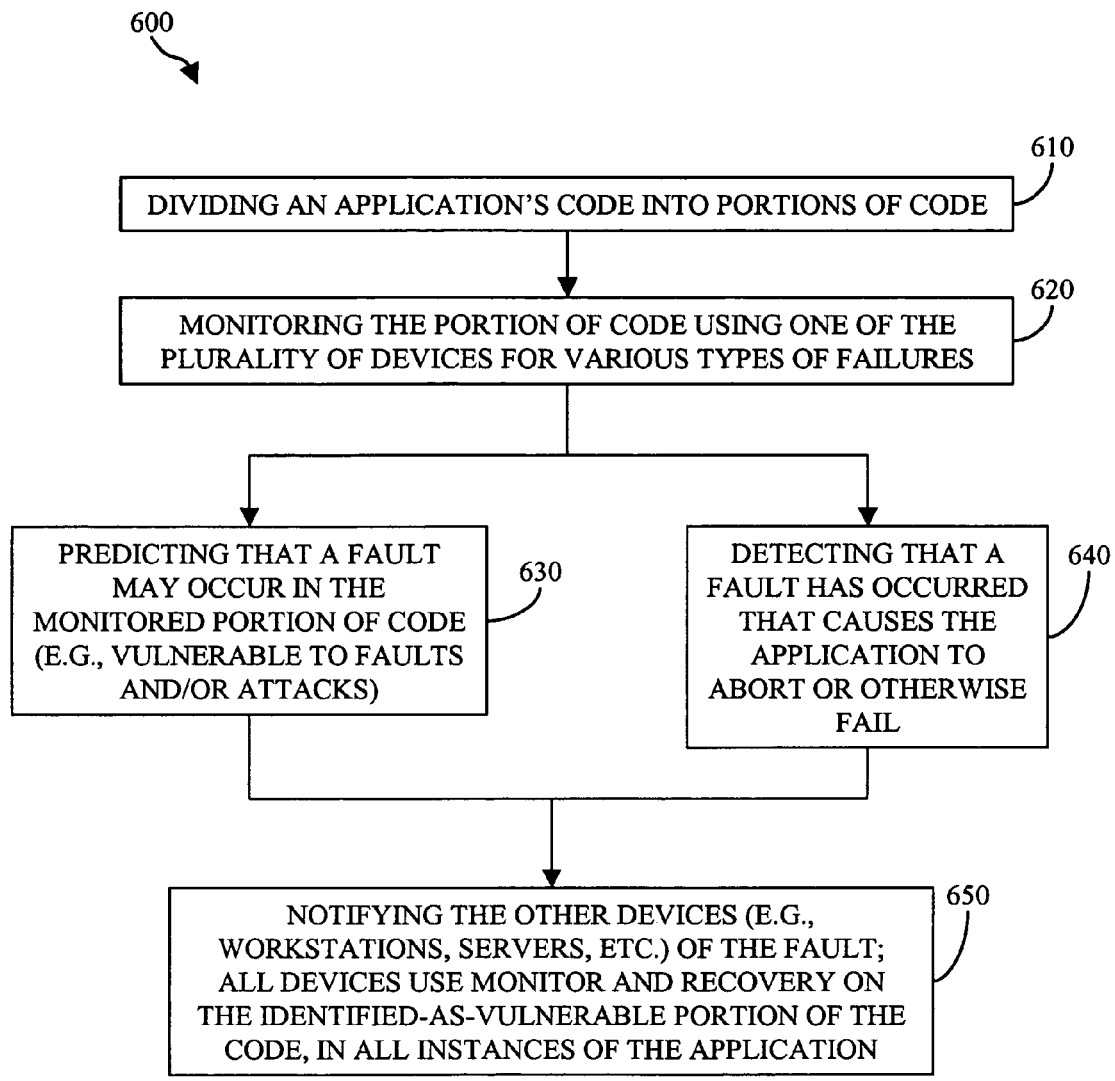
FIG. 6 shows a simplified flowchart illustrating detecting and repairing an application using an application community in accordance with some embodiments of the present invention.

FIG. 6 is a simplified flowchart illustrating the various steps performed in using an application community to monitor an application for faults and repair the application in accordance with some embodiments of the present invention. This is a generalized flow chart. It will be understood that the steps shown in FIG. 6 may be performed in any suitable order, some may be deleted, and others added.

Generally, the system may divide an application's code into portions of code at step 610. Each portion or slice of the application's code may, for example, be assigned to one of the members of the application community (e.g., workstation, server, etc.). Each member of the application community may monitor the portion of the code for various types of failures at step 620. As described previously, failures include programming errors, exceptions, software faults (e.g., illegal memory accesses, division by zero, buffer overflow attacks, TOCT-TOU violations, etc.), threats (e.g., computer viruses, worms, trojans, hackers, key recovery attacks, malicious executables, probes, etc.), and any other suitable fault that may cause abnormal application termination or adversely affect the one or more applications.

For example, the system may divide the portions of code based on the size of the application and the number of members in the application community (i.e., size of the application/members in the application community). Alternatively, the system may divide the portions of code based on the amount of available memory in each of the members of the application community. Any suitable approach for determining how to divide up the application's code may also be used. Some suitable approaches are described hereinafter.

For example, the system may examine the total work in the application community, W, by examining the cost of executing discrete slices of the application's code. Assuming a set of functions, F, that comprise an application's callgraph, the $i^{th}$ member of F is denoted as $f_i$. The cost of executing each $f_i$ is a function of the amount of computation present in $f_i$ (i.e., $x_i$) and the amount of risk in $f_i$ (i.e., $v_i$). The calculation of $x_i$ is driven by at least two metrics: $o_i$, the number of machine instructions executed as part of $f_i$, and $t_i$, the amount of time spent executing $f_i$. Both $o_i$ and $t_i$ may vary as a function of time or application workload according to the application's internal logic. For example, an application may perform logging or cleanup duties after the application passes a threshold number of requests.

In some embodiments, a cost function may be provided in two phases. The first phase calculates the cost due to the amount of computation for each $f_i$. The second phase normalizes this cost and applies the risk factor $v_i$ to determine the final cost of each $f_i$ and the total amount of work in the system. For example, let $$T = \sum_{i=1}^{n} x_i.$$

If $C(f_i, x_i)=x_i/T*100$, each cost may be normalized by grouping a subset of F to represent one unit of work.

In some embodiments, the system may account for the measure of a function's vulnerability. For example, the system treats $v_i$ as a discrete variable with a value of $\alpha$, where $\alpha$ takes on a range of values according to the amount of risk such that:

$$v_i = \begin{cases} \alpha & (\text{if } f_i \text{ is vulnerable}) \\ 1 & (\text{if } f_i \text{ is not vulnerable}) \end{cases}$$

Given $v_i$ for each function, the system may determine the total amount of work in the system and the total number of members needed for monitoring:

$$W = N_{vuln} = \sum_{i=1}^{n} v_i * r_i$$

After the system (e.g., a controller) or after each application community member has calculated the amount of work in the system, work units are distributed. In one example, a central controller or one of the workstations may assign each node approximately W/N work units. In another suitable example, each member of the application community may determine its own work set. Each member may iterate through the list of work units flipping a coin that is weighted with the value $v_i*r_i$. Therefore, if the result of the flip is "true," then the member adds that work unit to its work set.

Alternatively, the system may generate a list having n*W slots. Each function is represented by a number of entries on the list (e.g., $v_i*r_i$). Every member of the application community iterates through the list, for example, by tossing a coin. If the coin is "heads" or "true," the application community member monitors the function of the application for a given time slice. Because heavily weighted functions have more entries in the list, a greater number of users may be assigned to cover the application. The member may stop when its total work reaches W/N. Such an approach offers statistical coverage of the application.

In some embodiments, a distributed bidding approach may be used to distribute the workload of monitoring and repairing an application. Each node in the callgraph G has a weight $v_i*r_i$. Some subset of the nodes in F is assigned to each application community member such that each member does no more work than W/N work. The threshold is relaxed to be within some range C of W/N, where C is a measure of system fairness. Upon calculating the globally fair amount of work W/N, each application community member may adjust its workload by bargaining with other members using a distributed bidding approach.

Two considerations impact the assignment of work units to application community members. First, the system preferentially allocates work units with higher weights, as these work units likely have a heavier weight due to a high $v_i$. Even if the weight is derived solely from the performance cost, assigning more members to the work units with higher weights is beneficial because these members can round-robin the monitoring task so that any one member does not have to assume the full cost. Second, in some situations, $v_i*r_i$ may be greater than the average amount of work, W/N. Achieving fairness means that $v_i*r_i$ defines the quantity of application community members that is assigned to it and the sum of these quantities defines the minimum number of members in the application community.

In some embodiments, each application community member calculates a table. An example of such a table is shown in FIG. 7. Upon generating the table, application community members may place bids to adjust each of their respective workloads. For example, the system may use tokens for bidding. Tokens may map directly to the number of time quanta that an application community member is responsible for monitoring a work unit or a function of an application. The system ensures that each node does not accumulate more than the total number of tokens allowed by the choice of C.

If an application community member monitors more than its share, then the system has increased coverage and ensured that faults are detected as quickly as possible. As shown in steps 630 and 640, each application community member may predict that a fault may occur in the assigned portion of code or may detect that a fault has occurred causing the application to abort, where the assigned portion of the code was the source of the fault. As faults are detected, applications members may each proactively monitor assigned portions of code containing the fault to prevent the application from further failures. As discussed previously, the application community member may isolate the portion of the code that caused the fault and use the emulator to test vaccines or fixes. At step 650, the application community member that detects or predicts the fault may notify the other application community members. Other application members that have succumbed to the fault may be restarted with the protection mechanisms or fixes generated by the application member that detected the fault.

Assuming a uniform random distribution of new faults across the application community members, the probability of a fault happening at a member, k, is: P (fault)=1/N. Thus, the probability of k detecting a new fault is the probability that the fault happens at k and that k detects the fault: P (fault at k $\Lambda$ detection)=1/N*$k_i$, where $k_i$ is the percentage of coverage at k. The probability of the application community detecting the fault is:

$$P(\text{AC detect}) = \sum_{i=1}^{N} \frac{1}{N} * k_i$$

As each $k_i$ goes to 100%, the above-equation becomes $$\sum_{i=1}^{N} \frac{1}{N},$$

or N/N, a probability of 1 that the fault is detected when it first occurs.

In accordance with the present invention, methods and systems for monitoring and repairing an application from a variety of software failures are provided.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

The following references are incorporated by reference herein in their entireties:

CERT Advisory CA-2003-21: W32/Blaster Worm. http://www.cert.org/advisories/CA-2003-20.html, August 2003.

The Spread of the Sapphire/Slammer Worm. http://www.silicondefense.com/research/worms/slammer.php, February 2003.

A. Avizienis. The n-version approach to fault-tolerant software. IEEE Transactions on Software Engineering, 11(12): 1491ñ1501, 1985.

A. Baratloo, N. Singh, and T. Tsai. Transparent Run-Time Defense Against Stack Smashing Attacks. In Proceedings of the USENIX Annual Technical Conference, June 2000.

A. Baratloo, N. Singh, and T. Tsai. Transparent Run-Time Defense Against Stack Smashing Attacks. In Proceedings of the USENIX Annual Technical Conference, June 2000.

E. G. Barrantes, D. H. Ackley, S. Forrest, T. S. Palmer, D. Stefanovic, and D. D. Zovi. Randomized Instruction Set Emulation to Disrupt Binary Code Injection Attacks. In 10th ACM Conference on Computer and Communications Security (CCS), October 2003.

S. Bhatkar, D. C. DuVarney, and R. Sekar. Address Obfuscation: an Efficient Approach to Combat a Broad Range of Memory Error Exploits. In Proceedings of the 12th USENIX Security Symposium, pages 105ñ120, August 2003.

S. Brilliant, J. C. Knight, and N. G. Leveson. Analysis of Faults in an N-Version Software Experiment. IEEE Transactions on Software Engineering, 16(2), February 1990.

D. Bruening, T. Garnett, and S. Amarasinghe. An Infrastructure for Adaptive Dynamic Optimization. In Proceedings of the International Symposium on Code Generation and Optimization, pages 265-275, 2003.

G. Candea and A. Fox. Crash-Only Software. In Proceedings of the 9th Workshop on Hot Topics in Operating Systems, May 2003.

H. Chen and D. Wagner. MOPS: an Infrastructure for Examining Security Properties of Software. In Proceedings of the ACM Computer and Communications Security (CCS) Conference, pages 235-244, November 2002.

M. Chew and D. Song. Mitigating Buffer Overflows by Operating System Randomization. Technical Report CMU-CS-02-197, Carnegie Mellon University, December 2002.

S. A. Crosby and D. S. Wallach. Denial of Service via Algorithmic Complexity Attacks. In Proceedings of the 12th USENIX Security Symposium, pages 29-44, August 2003.

B. Demsky and M. C. Rinard. Automatic Detection and Repair of Errors in Data Structures. In Proceedings of the 18th Annual ACM SIGPLAN Conference on Object Oriented Programming, Systems, Languages, and Applications, October 2003.

E. Duesterwald and S. P. Amarsinghe. On the Run—Building Dynamic Program Modifiers for Optimization, Introspection, and Security. In Conference on Programming Language Design and Implementation (PLDI), 2002.

G. W. Dunlap, S. King, S. Cinar, M. A. Basrai, and P. M. Chen. ReVirt: Enabling Intrusion Analysis Through Virtual-Machine Logging and Replay. In Proceedings of the Symposium on Operating Systems Design and Implementation (OSDI), February 2002.

C. C. et al. StackGuard: Automatic Adaptive Detection and Prevention of Buffer-Overflow Attacks. In Proceedings of the 7th USENIX Security Symposium, January 1998.

T. Garfinkel and M. Rosenblum. A Virtual Machine Introspection Based Architecture for Intrusion Detection. In 10th ISOC Symposium on Network and Distributed Systems Security (SNDSS), February 2003.

D. E. Geer. Monopoly Considered Harmful. IEEE Security & Privacy, 1(6):14 & 17, November/December 2003.

G. Goth. Addressing the Monoculture. IEEE Security & Privacy, 1(6):8-10, November/December 2003.

T. Jim, G. Morrisett, D. Grossman, M. Hicks, J. Cheney, and Y. Wang. Cyclone: A safe dialect of C. In Proceedings of the USENIX Annual Technical Conference, pages 275-288, June 2002.

G. S. Kc, A. D. Keromytis, and V. Prevelakis. Countering Code-Injection Attacks With Instruction-Set Randomization. In 10th ACM Conference on Computer and Communications Security (CCS), October 2003.

S. T. King and P. M. Chen. Backtracking Intrusions. In 19th ACM Symposium on Operating Systems Principles (SOSP), October 2003.

S. T. King, G. Dunlap, and P. Chen. Operating System Support for Virtual Machines. In Proceedings of the USENIX Annual Technical Conference, June 2003.

V. Kiriansky, D. Bruening, and S. Amarasinghe. Secure Execution Via Program Shepherding. In Proceedings of the 11th USENIX Security Symposium, August 2002.

D. Mosberger and T. Jin. httperf: A tool for measuring web server performance. In First Workshop on Internet Server Performance, pages 59-67. ACM, June 1998.

N. Nethercote and J. Seward. Valgrind: A Program Supervision Framework. In Electronic Notes in Theoretical Computer Science, volume 89, 2003.

J. Newsome and D. Dong. Dynamic Taint Analysis for Automatic Detection, Analysis, and Signature Generation of Exploits on Commodity Software. In The 12th Annual Network and Distributed System Security Symposium, February 2005.

J. Oplinger and M. S. Lam. Enhancing Software Reliability with Speculative Threads. In Proceedings of the 10th International Conference on Architectural Support for Programming Languages and Operating Systems (ASPLOS X), October 2002.

V. Prevelakis. A Secure Station for Network Monitoring and Control. In Proceedings of the 8th USENIX Security Symposium, August 1999.

N. Provos. Improving Host Security with System Call Policies. In Proceedings of the 12th USENIX Security Symposium, pages 257-272, August 2003.

J. C. Reynolds, J. Just, L. Clough, and R. Maglich. On-Line Intrusion Detection and Attack Prevention Using Diversity, Generate-and-Test, and Generalization. In Proceedings of the 36th Annual Hawaii International Conference on System Sciences (HICSS), January 2003.

M. Rinard, C. Cadar, D. Dumitran, D. Roy, and T. Leu. A Dynamic Technique for Eliminating Buffer Overflow Vulnerabilities (and Other Memory Errors). In Proceedings 20th Annual Computer Security Applications Conference (ACSAC), December 2004.

M. Rinard, C. Cadar, D. Dumitran, D. Roy, T. Leu, and J. W Beebee. Enhancing Server Availability and Security Through Failure-Oblivious Computing. In Proceedings 6th Symposium on Operating Systems Design and Implementation (OSDI), December 2004.

A. Rudys and D. S. Wallach. Transactional Rollback for Language-Based Systems. In ISOC Symposium on Network and Distributed Systems Security (SNDSS), February 2001.

A. Rudys and D. S. Wallach. Termination in Language-based Systems. ACM Transactions on Information and System Security, 5(2), May 2002.

H. Shacham, M. Page, B. Pfaff, E. Goh, N. Modadugu, and D. Boneh. On the Effectiveness of Address-Space Randomization. In Proceedings of the 11th ACM Conference on Computer and Communications Security (CCS), pages 298-307, October 2004.

S. Sidiroglou and A. D. Keromytis. A Network Worm Vaccine Architecture. In Proceedings of the IEEE Workshop on Enterprise Technologies: Infrastructure for Collaborative Enterprises (WETICE), Workshop on Enterprise Security, pages 220-225, June 2003.

S. Sidiroglou, M. E. Locasto, S. W. Boyd, and A. D. Keromytis. Building A Reactive Immune System for Software Services. In Proceedings of the 11th USENIX Annual Technical Conference (to appear), April 2005.

A. Smirnov and T. Chiueh. DIRA: Automatic Detection, Identification, and Repair of Control-Hijacking Attacks. In The 12th Annual Network and Distributed System Security Symposium, February 2005.

M. Stamp. Risks of Monoculture. Communications of the ACM, 47(3):120, March 2004.

G. E. Suh, J. W. Lee, D. Zhang, and S. Devadas. Secure program execution via dynamic information flow tracking. SIGOPS Oper. Syst. Rev., 38(5):85-96, 2004.

T. Toth and C. Kruegel. Accurate Buffer Overflow Detection via Abstract Payload Execution. In Proceedings of the 5th Symposium on Recent Advances in Intrusion Detection (RAID), October 2002.

N. Wang, M. Fertig, and S. Patel. Y-Branches: When You Come to a Fork in the Road, Take It. In Proceedings of the 12th International Conference on Parallel Architectures and Compilation Techniques, September 2003.

J. A. Whittaker. No Clear Answers on Monoculture Issues. IEEE Security & Privacy, 1(6):18-19, November/December 2003.

J. Yin, J.-P. Martin, A. Venkataramani, L. Alvisi, and M. Dahlin. Separating Agreement from Execution for Byzantine Fault Tolerant Services. In Proceedings of ACM SOSP, October 2003.

What is claimed is:

1. A method for repairing an application from software failures, wherein the application comprises code, the method comprising:

detecting a failure in execution of the application by monitoring the execution of the application;

in response to detecting the failure, isolating a portion of the code that caused the failure;

constructing a vaccine that repairs the failure;

testing the vaccine in an instrumented version of the isolated portion of code using an instruction-level emulator to verify that the vaccine repaired the failure; and in response to verifying that the vaccine repaired the failure, updating the application with the vaccine.

2. The method of claim 1, wherein the failure is at least one of: a buffer overflow, a buffer underflow, an illegal memory access, a division by zero, a time-of-check-to-time-of-use violation, and programming errors.

3. The method of claim 1, wherein the detecting is performed using at least one sensor, and wherein the at least one sensor includes one of a host-based sensor, a network-based sensor, and a honeypot.

4. The method of claim 1, wherein the application is being executed on a server and wherein detecting further comprises implementing a honeypot on a separate server that simulates the application.

5. The method of claim 1, further comprising generating a core dump file or other reporting information in response to the failure that caused the application to terminate.

6. The method of claim 5, wherein the core dump file or other information includes the type of failure that occurred, a stack trace, and other information that helps localize the failure in terms of the application portion of code that is vulnerable.

7. The method of claim 5, wherein the step of isolating the portion of the code that caused the failure is based at least in part on the core dump file or other information generated in response to detecting the failure.

8. The method of claim 1, wherein the failure exposes an input vector.

9. The method of claim 8, wherein the vaccine is constructed based at least in part on the input vector and/or its effects on the application execution.

10. The method of claim 8, wherein the testing the vaccine further comprises inputting the input vector into the instrumented version of the isolated portion of the code.

11. The method of claim 1, further comprising recording memory modification during the execution of the instrumented version of the isolated portion of the code.

12. The method of claim 1, wherein the instrumented version of the isolated portion includes a memory stack that has an original state, and the method further comprises reverting the memory stack back to the original state and generating an error return.

13. The method of claim 1, further comprising returning an error code that simulates the failure.

14. The method of claim 1, further comprising simulating an error code from the isolated portion of code.

15. The method of claim 1, further comprising mapping between the failures that may occur during the execution of the application and a set of failures that the application was programmed to handle.

16. The method of claim 1, wherein the step of updating the application further comprises automatically inserting additional code into the isolated portion of code.

17. A method for repairing an application from software failures, the method comprising:
monitoring execution the application for a failure using at least one sensor, wherein the application comprises code;
identifying where the code is vulnerable to the failure;
isolating a portion of the code based at least in part on the identification;
generating an instrumented version of the portion of the code;
constructing a vaccine based at least in part on the portion of the code;
emulating segments of the instrumented version with the vaccine to verify that the vaccine repaired the failure; and
updating the application based at least in part on the verification that the vaccine repaired the failure.

18. A system for repairing an application from software failures, the system comprising:
a processor having a memory, wherein the processor is configured to:
monitor execution of the application and corresponding code for a failure and isolates a portion of the code that caused the failure in response to detecting the failure;
emulate the portion of the code in an instruction level emulator; and
evaluate one or more potential vaccines on the portion of the code using the emulator to determine whether the portion of the code is repaired including applying one or more input variables that caused the failure on the portion of the code; and
update the application in response to repairing the portion of the code without user input.

19. The system of claim 18, wherein the failure is at least one of: a buffer overflow, a buffer underflow, an illegal memory access, a division by zero, a time-of-check-to-time-of-use violation, and programming errors.

20. The system of claim 18, wherein the sensor is one of a host-based sensor, a network-based sensor, and a honeypot.

21. The system of claim 18, wherein the application is implemented on a server, the system further comprising a honeypot implemented on a separate server that simulates the application.

22. The system of claim 18, wherein the processor is further configured to record memory modification during the evaluation of the isolated portion of the code.

23. The system of claim 18, wherein the processor is further configured to generating an error return that simulates the failure.

24. The system of claim 18, wherein the processor is further configured to generate a map between the failures that may occur during the execution of the application and a set of failures that the application was programmed to handle.

25. The system of claim 18, wherein the instruction-level emulator is further configured to automatically insert additional code into the portion of code.

26. A method for repairing an application from software failures, the method comprising:
defining an application community that includes a plurality of devices, each device executing an instance of the application;
assigning a portion of the application to each of the plurality of devices, each device monitoring the execution of its assigned portion of the application of its instance of the application;
receiving an indication that one of the plurality of devices has detected a failure in the execution of its assigned portion of the application of its instance of the application; and
in response to receiving an indication that one of the plurality of devices detected a failure, notifying the application community of the failure.

27. The method of claim 26, wherein the assigning further comprises assigning portions of the application to each of the plurality of devices based on the amount of available memory in each of the plurality of devices.

28. The method of claim 26, wherein the assigning further comprises assigning portions of the application to each of the plurality of devices based on the total workload of the application community.

29. The method of claim 26, wherein the assigning further comprises arbitrarily assigning portions of the application to each of the plurality of devices.

30. The method of claim 26, wherein the assigning further comprises allowing each device to adjust its monitoring workload by bargaining with other devices.

31. A method for repairing an application from software failures, wherein the application comprises code, the method comprising:
defining an application community that includes a plurality of devices, each device executing an instance of the application;
assigning each of the plurality of devices a failure to monitor in its instance of the application;
receiving an indication that one of the plurality of devices has detected its assigned failure in its instance of the application; and
in response to receiving the indication that one of the plurality of devices has detected its assigned failure, notifying the application community of the failure.

32. The method of claim 31, wherein the assigning further comprises assigning failures to monitor to each of the plurality of devices based on the amount of available memory in each of the plurality of devices.

33. The method of claim 31, wherein the assigning further comprises assigning failures to monitor to each of the plurality of devices based on the total workload of the application community.

34. The method of claim 31, wherein the assigning further comprises arbitrarily assigning failures to monitor to each of the plurality of devices.

35. The method of claim 31, wherein the assigning further comprises allowing each device to adjust its monitoring workload by bargaining with other devices.

36. A method for repairing an application operating on first and second members of an application community, the method comprising:
separating the application into first and second portions, wherein the first portion and the second portion each operate on the first member and the second member;
assigning the first portion to the first member for evaluation of failure in the first portion;
assigning the second portion to the second member for evaluation of failure in the second portion;

receiving from the first member an indication of a failure in the first portion and a repaired first portion; and transmitting to the second member the indication of the failure in the first portion and the repaired first portion.

37. The method of claim 36, further comprising assigning the first portion to the first member and assigning the second portion to the second member based on an amount of available memory in the first member and the second member.

38. The method of claim 36, further comprising assigning the first portion to the first member and assigning the second portion to the second member based on a workload of the application community.

39. The method of claim 36, further comprising reassigning the first portion and second portion based on a workload of the first member and the second member.

* * * * *